United States Patent
Satoh et al.

Patent Number: 5,122,956
Date of Patent: Jun. 16, 1992

[54] METHOD FOR CONTROLLING VEHICLE AUTOMATIC TRANSMISSION SYSTEMS

[75] Inventors: Yuji Satoh; Masuhiro Ohtsuka; Hiromi Kono, all of Higashimatsuyama, Japan

[73] Assignee: Diesel Kiki Co., Ltd., Tokyo, Japan

[21] Appl. No.: 497,539

[22] Filed: Mar. 22, 1990

[30] Foreign Application Priority Data

Mar. 27, 1989 [JP] Japan .................. 1-71805

[51] Int. Cl.⁵ .................. F16H 61/16; F16H 61/02
[52] U.S. Cl. .................. 364/424.1; 74/866
[58] Field of Search .................. 364/424.1; 74/866

[56] References Cited

U.S. PATENT DOCUMENTS

| | | | |
|---|---|---|---|
| 4,635,508 | 1/1987 | Tatsumi | 74/866 |
| 4,638,690 | 1/1987 | Hattori et al. | 364/424.1 |
| 4,823,643 | 4/1989 | Koshizawa | 74/866 |
| 4,967,620 | 11/1990 | Shimanaka | 74/866 |
| 4,977,992 | 12/1990 | Ohtsuka et al. | 364/424.1 |

*Primary Examiner*—Parshotam S. Lall
*Assistant Examiner*—E. J. Pipala
*Attorney, Agent, or Firm*—Pollock, Vande Sande & Priddy

[57] ABSTRACT

In a method for automatically controlling the gear-shifting operation of a vehicle gear transmission so as to shift the transmission to a calculated target position according to the vehicle operation parameter(s), the stability of the calculated target position is discriminated and the required gear-shifting operation is carried out only when the stability satisfies a prescribed condition, whereby unnecessary gear-shifting operations can be effectively eliminated even if for some reason the calculated target gear position frequently changes.

7 Claims, 2 Drawing Sheets

METHOD FOR CONTROLLING VEHICLE AUTOMATIC TRANSMISSION SYSTEMS

BACKGROUND OF THE INVENTION

1. Field of the Invention

The present invention relates to a method for controlling vehicle automatic transmission systems, and more particularly to a control method for an automatic transmission system which includes a friction type clutch and a gear type transmission and is electronically controlled in accordance with the operation condition of the associated vehicle to perform automatic gear-shift operations.

2. Description of the Prior Art

The conventional automatic transmission system of the type described above uses gear-shift map data for determining a suitable gear position for the operation condition of the vehicle at each moment, and the gear-shifting operation of the transmission is automatically performed in accordance with the determination. With this system, since the target gear position determined is liable to change frequently if the operating condition of the vehicle is not stable, unnecessary gear-shift operations will be carried out. This will give an uncomfortable feeling to the vehicle passenger.

To overcome this drawback, in the Japanese Patent Application Public Disclosure No. Sho 60-252852 there is proposed a gear-shifting control method for inhibiting unnecessary gear-shifting operations by making it possible to carry out a gear-shifting operation only after the change in the amount of the operation of the acceleration pedal has become steady.

However, according to the proposed method, in the case where an operation parameter or parameters other than the amount of operation of the accelerator pedal becomes unstable, for example in the case the level of the output signal of a vehicle speed sensor becomes unstable due to noise coming from outside or insufficient electrical contact of a connector, the target gear position will change rapidly and cause unnecessary gear-shifting operations to be carried out frequently.

SUMMARY OF THE INVENTION

It is an object of the present invention to provide an improved method for controlling a vehicle automatic transmission system.

It is another object of the present invention to provide a method for controlling a vehicle automatic transmission system, which is capable of effectively suppressing the performance of unnecessary gear-shifting operations.

It is a further object of the present invention to provide a control method for an automatic transmission system, which is capable of carrying out precise gear-shifting operations without deterioration of the response characteristics.

According to the present invention, in a method for electronically and automatically controlling the gear-shifting operation of a vehicle gear-type transmission coupled through a clutch with an internal combustion engine so as to shift the transmission to a target gear position which is determined by a map calculation in response to at least the amount of the operation of an accelerator pedal and the vehicle speed, the stability of the target gear position is discriminated and the operation for shifting the transmission to the determined target gear position is carried out only when the stability satisfies a prescribed condition.

The computation for determining the target gear position for the vehicle operation condition at each instant is carried out at appropriate intervals, and the stability of resulting target gear position is checked by, for example, discriminating whether or not the same target gear position is successively determined over a prescribed period of time. In the case where the stability exceeds a predetermined level the gear-type transmission is shifted to the target gear position at that time.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
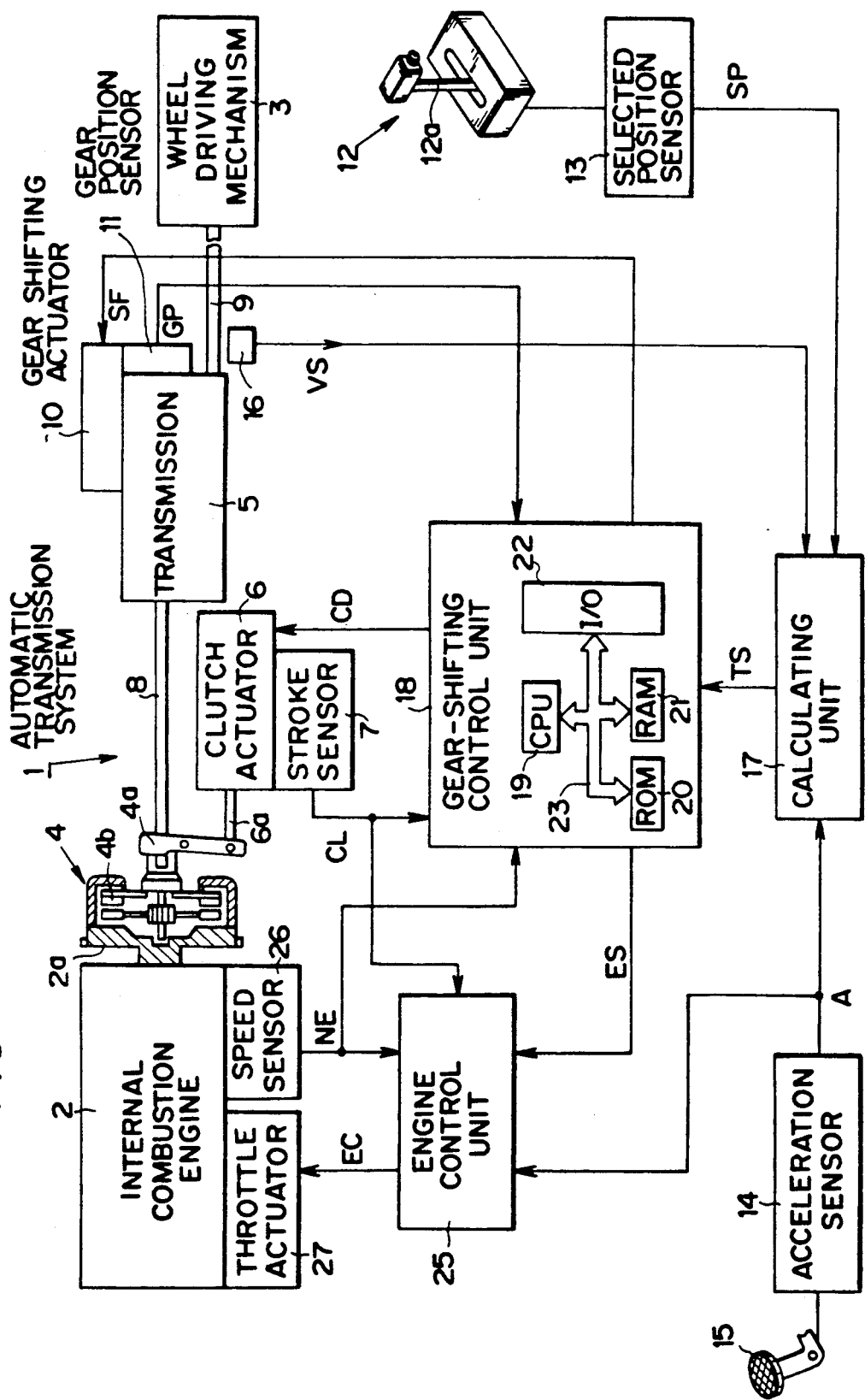
FIG. 1 is a view schematically showing an embodiment of an automatic transmission system for vehicles, whose operation is controlled according to the present invention.

In FIG. 1, an embodiment of an automatic transmission system for vehicles according to the present invention is illustrated in schematic form. Reference numeral 1 generally designates an automatic transmission system for a vehicle (not shown) powered by an internal combustion engine 2 and the automatic transmission system 1 comprises a friction clutch 4 mounted on an engine flywheel 2a and a gear type synchromesh transmission 5. In this embodiment, the friction clutch 4 is a well-known dry-type single-disc clutch having a clutch release lever 4a and a pressure plate 4b. In order to control the engaging/disengaging (ON/OFF) operation of the clutch 4, there is provided a clutch actuator 6 having a piston rod 6a connected to the clutch release lever 4a for actuating the clutch release lever 4a. The clutch actuator 6 is coupled with a stroke sensor 7 for detecting the position of the pressure plate 4b of the clutch 4 and a clutch signal CL indicating the position of the pressure plate 4b is produced by the stroke sensor 7. The clutch 4 is connected by a connecting rod 8 with the transmission 5, and the rotational output of the transmission 5 is transmitted through a propeller shaft 9 to a wheel driving mechanism 3 of the vehicle.

The transmission 5 is actuated by a gear shifting actuator 10 associated therewith, and the gear position set in the transmission 5 is detected by a gear position sensor 11 associated with the transmission 5 to produce a gear position signal GP showing the actual gear position set in the gear transmission 5.

The vehicle has a selector 12 with a selecting lever 12a that is manipulated by the driver to select one position from among a plurality of positions which include an "N" position (neutral), a "3" position (3rd gear), a "4" position (4th gear), a "5" position (5th gear), a "D" position (automatic gear changing position), and an "R" position (reverse gear). That is, the driver manipulates the selecting lever 12a in order to select a desired control mode for the transmission 5. The selecting lever 12a is coupled with a selected position sensor 13 for producing a selected position signal SP showing the position of the selecting lever 12a.

An acceleration sensor 14 is associated with an accelerator pedal 15 and produces an acceleration signal A showing the amount of operation of the accelerator pedal 15. Reference numeral 16 indicates a known vehicle speed sensor mounted on the propeller shaft 9 for producing a vehicle speed signal VS showing the running speed of the vehicle powered by the engine 2.

Figure 2:
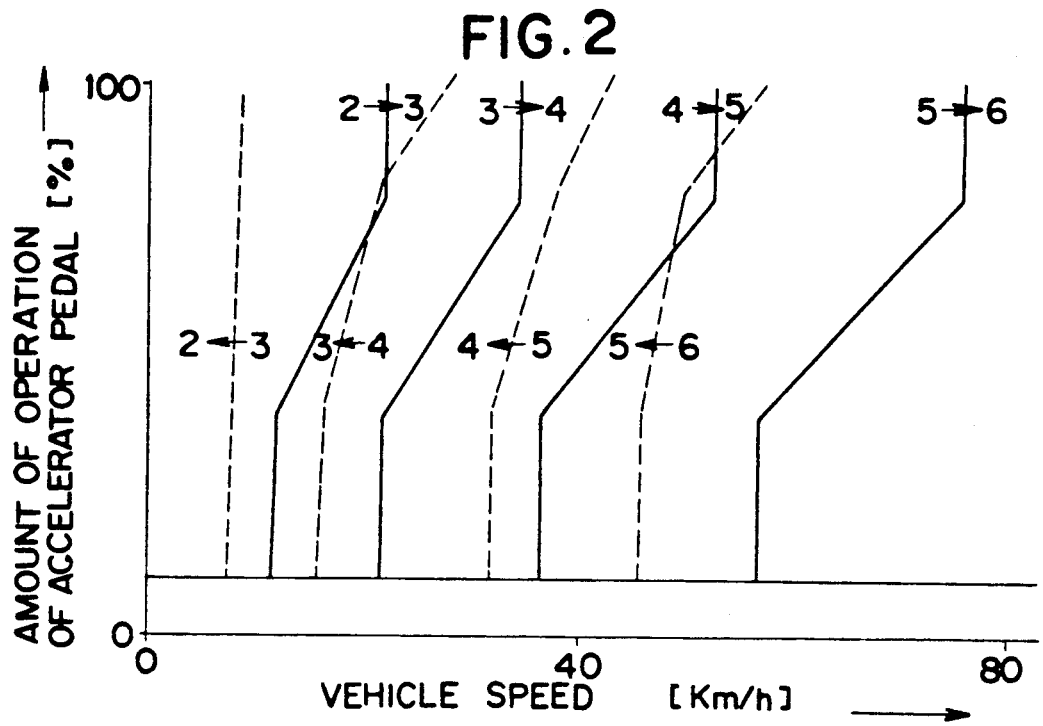
FIG. 2 is a view showing characteristic curves corresponding to map data for gear shift control used in the gear-shifting control unit of FIG. 1.

The vehicle speed signal VS, the selected position signal SP, and the acceleration signal A, which represent operating parameters of the vehicle, are applied to a calculating unit 17 in which gear-shift map data corresponding the gear-shift characteristics shown in FIG. 2 is stored. The gear-shift map data is for determining the gear position of the transmission 5 to be used at each instant in response to the amount of operation of the accelerator pedal 15 and the vehicle speed.

In the graph of FIG. 2, the vehicle speed is plotted on the abscissas and the amount of operation of the accelerator pedal 15 is plotted on the of ordinate. The solid lines indicate the conditions for shift-up operation, and the broken lines indicate the conditions for shift-down operation. Furthermore, the numerals assigned in the graph designate the gear positions of the transmission 5.

Returning to FIG. 1, in the calculating unit 17 a plurality of sets of gear-shift map data are provided, each of which is assigned so as to correspond to one of the positions selectable by the selecting lever 12a. The calculating unit 17 is responsive to the selected position signal SP to select a set of gear-shift map data corresponding to the position selected by the selector 12 at that time, and carries out a calculation to determine the target gear position on the basis of the selected gear shift map data in accordance with the acceleration signal A and the vehicle speed signal VS. The result calculated by the calculating unit 17 is output as a target signal TS representing the target gear position to which the transmission is to be shifted. The target signal TS is applied to a gear-shifting control unit 18. In the calculating unit 17 the necessary map calculation is performed at appropriate time intervals to obtain the target signal TS as discrete data.

The gear shifting control unit 18 includes a central processing unit (CPU) 19, read-only memory (ROM) 20, random access memory (RAM) 21 and I/O interface 22, which are interconnected by a bus 23 to form a microcomputer. The gear-shifting control unit 18 receives the clutch signal CL, the gear position signal GP and an engine speed signal NE output by a known speed sensor 26 associated with the internal combustion engine 2 and indicating the rotational speed of the internal combustion engine 2. These signals are converted into digital form in the I/O interface 22 to obtain clutch data DL, gear position data DG, and engine speed data DN. These data DL, DG and DN are processed in accordance with a control program (which will be described later) stored in advance in the ROM 20 to produce a shift control signal SF, a clutch control signal CD and an engine control signal ES, which serve to shift the gear of the transmission 5 into the target gear position indicated by the target signal TS.

The shift control signal SF is applied to the gear shifting actuator 10 for controlling the gear shifting actuator 10 so as to shift the gear of the transmission 5 into the determined target gear position, while the clutch control signal CD for driving the clutch 4 so as to engage or disengage the clutch 4, is applied to the clutch actuator 6.

The level of the engine control signal ES changes to high from low at the time of the start of the control operation for gear-changing in the gear-shifting control unit 18, and the level of the signal ES changes to low from high at the time of the termination of the control operation for gear-changing in the gear-shifting control unit 18.

The engine control signal ES is supplied to an engine control unit 25 which receives &he acceleration signal A, the clutch signal CL and the engine speed signal NE.

The engine control unit 25 functions to regulate the engine speed based on the manipulation of the accelerator pedal 15 when the level of the engine control signal ES is low. Namely, the engine control unit 25 is responsive to the acceleration signal A to produce an engine speed control signal EC, which is applied to a throttle actuator 27 for controlling the fuel supply to the engine 2. Thus, the throttle actuator 27 is actuated by the engine speed control signal EC in accordance with the amount of operation of the accelerator pedal 15 and the engine speed can be regulated in accordance with the manipulation of the accelerator pedal 15. The above-described operation is performed by the engine control unit 25 only when the level of the engine control signal ES is low.

When the level of the engine control signal ES is high, the engine control unit 25 functions to maintain the engine speed at its idling speed in response to the engine speed signal NE. Accordingly it is possible to suppress excessive increase in engine speed while the clutch is disengaged for shifting the gears.

According to the control program stored in the ROM 20, the shift control signal SF and the clutch control signal CD can be produced as a set of control signals from the gear-shifting control unit 18 for automatically shifting the gear position of the transmission 5 to the suitable position for the operation condition of the vehicle when requested, and the transmission 5 and the clutch 4 are controlled in the usual manner by means of the gear shifting actuator 10 and the clutch actuator 6 in response to the signals SF and CD, respectively. Furthermore, it is discriminated whether or not the target gear-shift position indicated by the target signal TS changes frequently, and the control operation for shifting the transmission 5 is inhibited during the time the target gear-shift position changes frequently.

The control program will now be described in more detail, with reference to FIG. 3.

Figure 3:
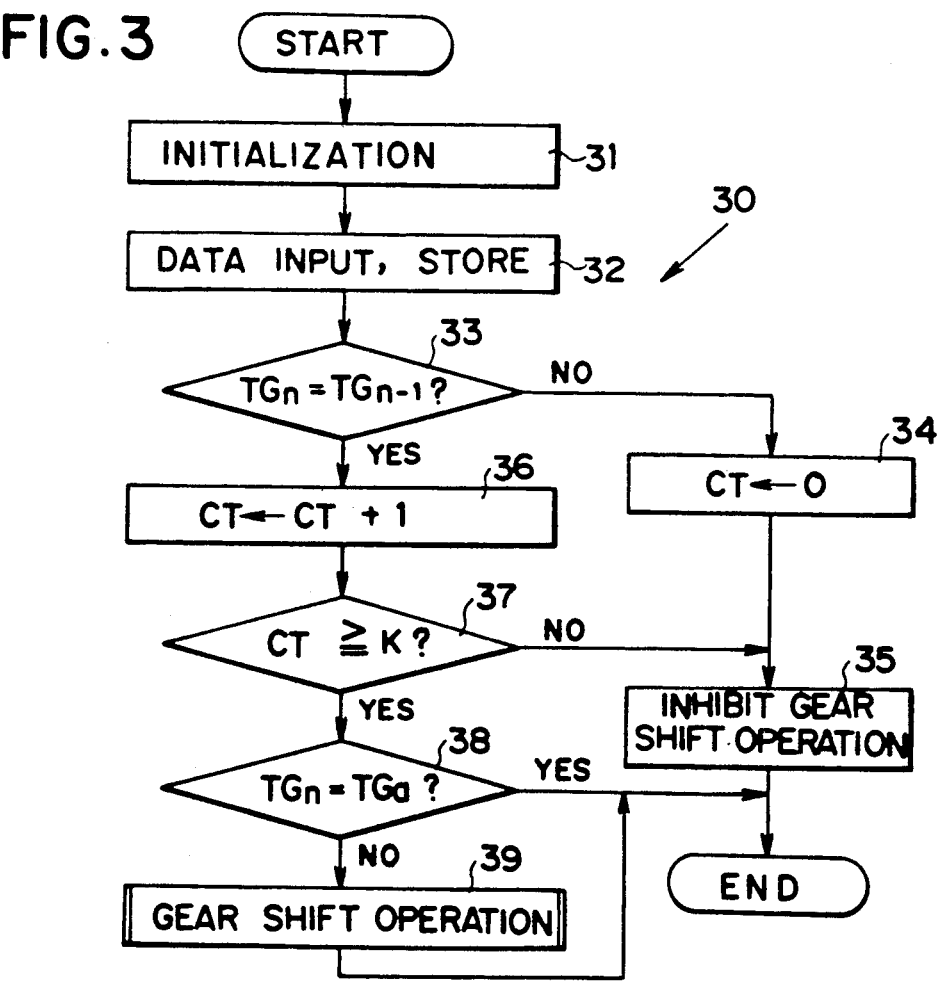
FIG. 3 is a flowchart showing a control program which is executed in a microcomputer system shown in FIG. 1.

In FIG. 3, reference numeral 30 designates a control program which is executed at regular intervals, for example, every 200 (ms). When the execution of the control program 30 starts, the operation moves to step 31 wherein an initialization operation is executed. After this, the operation moves to step 32 wherein data DL, DG, DN and data TD representing in digital form the target gear position $TG_n$ shown by the target signal TS at that time are input and stored in the RAM 21. Then, the operation moves to step 33 wherein the discrimination is made as to whether or not the target gear position $TG_{n-1}$ obtained in the preceding program cycle is the same as the target gear position $TG_n$ obtained in the current program cycle. If $TG_n$ is not the same as $TG_{n-1}$, the determination in step 33 becomes No and the operation moves to step 34 wherein the count CT of a counter provided in the microcomputer system of the gear-shifting control unit 18 is set to zero. After this the operation moves to step 35 wherein the operation for inhibiting the transmission 5 from being shifted in accordance with the target signal TS at that time is executed so that the present gear position is kept as it is, and the operation is completed.

On the other hand, if it is confirmed in step 33 that the target position $TG_{n-1}$ is the same as the target position $TG_n$, the determination in step 33 becomes YES and the operation moves to step 36 wherein the count CT is incremented by one. In the following step 37, discrimination is made as to whether or not the count CT is equal to or greater than a prescribed value K. If the count CT is less than the prescribed value K, the determination in step 37 becomes NO, and the operation moves to step 35. In contrast, in the case where the count CT is not less than the prescribed value K the determination in step 37 becomes YES and the operation moves to step 38.

In step 38 discrimination is made as to whether or not the target gear position $TG_n$ obtained in this program cycle is the same as the actual gear position $TG_a$ indicated by the data DG. If $TG_n$ is not the same as $TG_a$, the determination in step 38 becomes NO and the operation moves to step 39 wherein the operation for shifting the transmission 5 to the target gear position $TG_n$ is executed. The signals CD, SF and ES necessary for carrying out the gear-shifting operation are produced at the time of the execution of step 39 and the execution of this program cycle is terminated.

If the determination is YES in step 38 because $TG_n$ is the same as $TG_a$, the execution of the control program 30 is terminated without performance of the gear-shifting operation.

With this arrangement, data TD representing the target gear position according to the target signal TS supplied from the calculating unit 17 is stored in the RAM 21 at each execution of the control program 30, and the target gear position $TG_n$ obtained in the current program cycle is compared with the target gear position $TG_{n-1}$ obtained in the preceding program cycle. The count CT of the counter is incremented by one when $TG_n$ and $TG_{n-1}$ are the same, while the count CT is made zero if it is once found that the target position $TG_n$ is not the same as the target position $TG_{n-1}$. Thus, the gear-shifting operation for shifting the transmission 5 to the position indicated by the target signal TS supplied from the calculating unit 17 can be carried out if the above equivalent status is successively obtained for K successive program cycles. As a result, it is checked at appropriate time intervals whether or not the target signal TS is stable, and the transmission is shifted to the target gear position indicated by the target signal TS if necessary only when the target gear position indicated by the target signal TS remains unchanged for K successive program cycles of the control program.

Thus, if the target gear position changes frequently for a short period of time because, for example, the amount of operation of the accelerator pedal 15 is changed rapidly, or a stable output cannot be obtained from the vehicle speed sensor due to insufficient electric contact at a connector, the transmission 5 is inhibited from being shifted to the target gear position even if $TG_n$ is not the same as $TG_a$. In contrast, if it is confirmed that the same target gear position is successively obtained for K program cycles, the transmission 5 can be automatically shifted to the required target gear position. As a result, it is that the transmission 5 is frequently shifted to target gear different positions owing to an unstable condition, and the gear-shifting operation is realized only when the stable target gear position is obtained.

In addition, the function for obtaining the target gear position may be realized by the use of the gear-shifting control unit 18 without the use of the calculating unit 17.

According to the present invention, since the discrimination as to whether or not the gear-shifting operation to the target position should be carried out is made on the basis of the stability of the calculated target gear position over a predetermined time, unnecessary gear-shifting operations can be more effectively suppressed without the deterioration of response characteristics than in the case where a filter is used for eliminating the various undesired or noise components of the input data.

We claim:

1. A method for electronically and automatically controlling the gear-shifting operation of a vehicle gear transmission coupled through a clutch with an internal combustion engine in accordance with target position data calculated at appropriate intervals, said method comprising steps of:
    discriminating whether or not a stability of a target gear position shown by the target position data is in a prescribed condition;
    comparing the target gear position with an actual gear position of the gear transmission only when the stability satisfies the prescribed conditions; and
    shifting the gear transmission to the target gear position in the case where the actual gear position is not the same as the target gear position.

2. A method as claimed in claim 1, wherein the target position data is calculated by a map calculation in response to at least the amount of operation of an accelerating member and a vehicle speed.

3. A method as claimed in claim 2, wherein the stability of the resulting target gear position is checked by discriminating whether or not the same target gear position is successively determined over a prescribed period of time.

4. A method as claimed in claim 3, wherein a current target gear position is compared with a preceding target gear position each time the target gear position is determined and a counter is incremented when the current target gear position is the same as the preceding target gear position, while the counter is reset when the current target gear position is not the same as the preceding target gear position, whereby it is determined in response to a count of the counter whether or not the same target gear position has been successively determined over a prescribed period of time.

5. A method as claimed in claim 4, wherein it is discriminated whether or not the count of the counter exceeds a predetermined count, and the gear-shifting operation is inhibited until the count has reached the predetermined count.

6. A method for electronically and automatically controlling the gear-shifting operation of a vehicle gear transmission coupled through a clutch with an internal combustion engine in accordance with target position data calculated by a map calculation in response to at least the amount of operation of an accelerating member and a vehicle speed at appropriate intervals, said method comprising steps of:

discriminating whether or not a stability of a target gear position shown by the target position data is in a prescribed condition;

comparing the target gear position with an actual gear position of the gear transmission; and shifting the gear transmission to the target gear position only when the stability satisfies the prescribed condition in the case where the actual gear position is not the same as the target gear position.

7. A method for automatically shifting a vehicle gear transmission into an appropriate gear position in accordance with target position data calculated at appropriate intervals by a map calculation in response to at least the amount of operation of an accelerating member and a vehicle speed, said method comprising steps of:

discriminating whether or not a stability of a target gear position shown by the target position data is in a prescribed condition on the basis of a series of the target position data obtained by the map calculation;

determining the target gear position as the appropriate gear position when it is discriminated by said discriminating step that the stability satisfies the prescribed condition;

comparing the target gear position with an actual gear position of the gear transmission; and shifting the gear transmission to the appropriate gear position in the case where an actual gear position of the gear transmission is not the same as the appropriate gear position.

* * * * *